United States Patent [19]

Cassell et al.

[11] Patent Number: 5,774,918
[45] Date of Patent: Jul. 7, 1998

[54] MODULAR ROLLING PIN WITH DOUGH STORAGE MEANS

[75] Inventors: Wendy Cassell, 170-16 39th Ave., Flushing, N.Y. 11358; Edwin Chan, Brooklyn, N.Y.; Stephen Russak, Fort Lee, N.J.

[73] Assignee: Wendy Cassell, Flushing, N.Y.

[21] Appl. No.: 690,355

[22] Filed: Jul. 26, 1996

Related U.S. Application Data

[60] Provisional application No. 60/016,315 May 7, 1996.
[51] Int. Cl.[6] .................................................. B25F 1/00
[52] U.S. Cl. .................................................. 7/111; 429/14
[58] Field of Search ................................ 7/111; 429/14

[56] References Cited

U.S. PATENT DOCUMENTS

| | | |
|---|---|---|
| 50,528 | 10/1865 | Witsel . |
| 177,319 | 5/1876 | Blaul . |
| 931,691 | 8/1909 | Fendring . |
| 1,192,230 | 7/1916 | Schappell . |
| 3,921,801 | 11/1975 | Sway . |
| 3,994,652 | 11/1976 | Kuzyk . |
| 4,836,396 | 6/1989 | Ancona . |

*Primary Examiner*—James G. Smith
*Attorney, Agent, or Firm*—Londa and Traub LLP

[57] ABSTRACT

A modular rolling pin has a plurality of cylindrical linking modules and a plurality of cylindrical dough storage modules. The linking modules and the dough storage modules are releasably and interchangeably lockable to each other, and each of the dough storage modules consist of two opposing sections for retaining dough therein. Each of opposing sections define approximately a corresponding half of a generally rounded dough storage space.

6 Claims, 2 Drawing Sheets

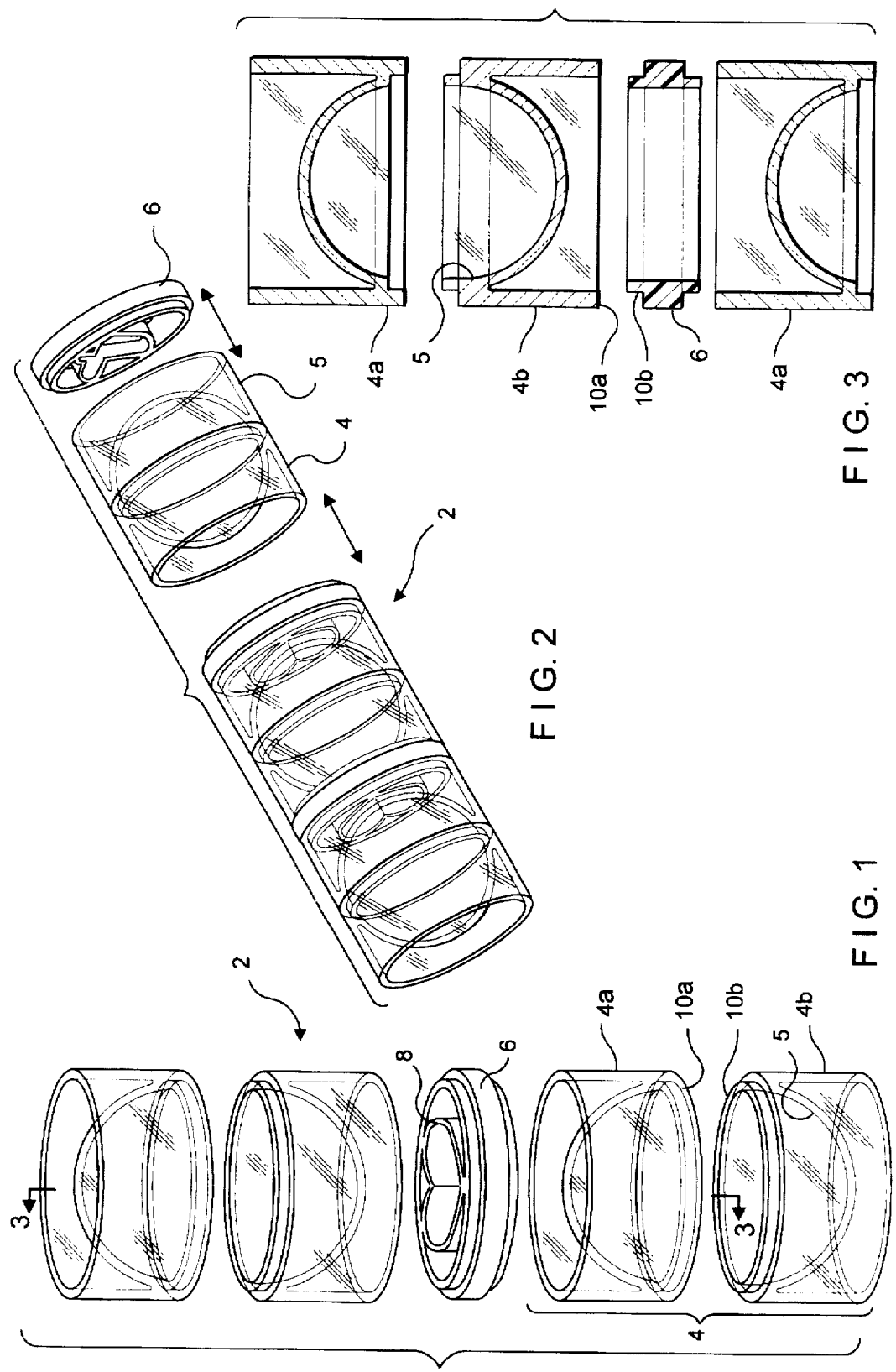

MODULAR ROLLING PIN WITH DOUGH STORAGE MEANS

CIP of 60/016,315 filed May 7, 1996.

BACKGROUND OF THE INVENTION

The present invention relates to a rolling pin for dough or the like having a modular structure, the modules consisting of dough storage modules and linking modules. In particular, the invention relates to a rolling pin having a dough storage module comprising two separable opposing sections, which preferably come together to form a sphere or other rounded shape. The dough storage module thus provides easy access to the dough, while keeping the dough airtight in a ready-to-use shape. In a preferred embodiment, the linking modules may also have cookie cutter molds on one or both end faces.

Existing devices include U.S. Pat. No. 3,921,801 to Sway, which teaches a modular, cylindrical storage means for a molding compound. In order to remove the molding compound, the entire device must be heated in order to melt the molding compound so as to permit the compound to be poured out of the storage area. The deep cylindrical shape would be problematic for retrieving dough or other material which must be removed easily at room temperature. U.S. Pat. No. 1,192,230 to Schappell provides a rolling pin having contained therein several cylindrical storage modules openable at one end thereof. However, while these storage modules may be useful for flour, spices, or other easily pourable or flowable compositions, they would not be practical for storing dough or other sticky solid compounds, which must be removed by hand or with the aid of a utensil.

It is therefore an object of the present invention to provide a modular rolling pin having a dough storage means which opens in a manner to allow easy access to the stored dough.

It is a further object to provide a modular rolling pin having a dough storage means which is shaped to permit easy removal of the stored dough.

It is a still further object to provide a modular rolling pin having a dough storage means which retains the dough in a shape which is in a ready-to-use shape upon removal.

SUMMARY OF THE INVENTION

Accordingly, the present invention provides a modular rolling pin having a plurality of cylindrical linking modules and a plurality of cylindrical dough storage modules. The linking modules and the dough storage modules are releasably and interchangeably lockable to each other, and each of the dough storage modules consists of two opposing sections for retaining dough therein. Each of the opposing sections defines a corresponding portion, preferably matching half sections, of a generally rounded dough storage space. In a preferred embodiment, the opposing sections are each relatively shallow, and are preferably shaped as conforming halves of a sphere.

Although the preferred shape of the conforming halves is a hemisphere, it should be clear that any concave shape will provide the advantages of the invention, particularly if the shape is shallow to permit easy removal of the dough. Thus, a parabolic or a saucer shaped section would also function well, although the greatest volume for storage would be provided by the hemisphere, which hemisphere would also provide the dough in a useful shape for working. In addition, while a rounded shape is preferred for ease of removal, shapes having corners may also be useful so long as they approach the properties of roundedness with respect to ease of dough removal. An example would be a multi-sided polygon which resembled a sphere, such as a geodesic dome shape. However, shapes such as rectangles having deep corners could cause difficulty in removing all of the dough.

Additional embodiments may have molds on the end faces of the linking modules, which may be used to mold cookies and the like when the end face is exposed. Also, designs may be imparted to the dough being rolled out by way of an embossed design provided on the outer perimeter of the linking modules. Furthermore, the dough storage modules may be transparent in order to allow viewing of the stored dough from outside.

BRIEF DESCRIPTION OF THE DRAWINGS

The accompanying drawings serve to illustrate the invention, as follows:

FIG. 1 is an exploded pespective view of a combination of the invention.

FIG. 2 is a partially exploded perspective view of a combination of the invention, wherein some of the modules are linked together.

FIG. 3 is a cross-section view of a dough storage module, taken along line III—III.

DETAILED DESCRIPTION OF THE INVENTION

Figure 5A:
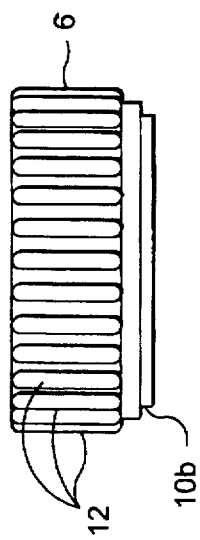
FIG. 5 is a side view of a single ribbed linking module (A) and several ribbed linking modules (B) connected.
Figure 5B:
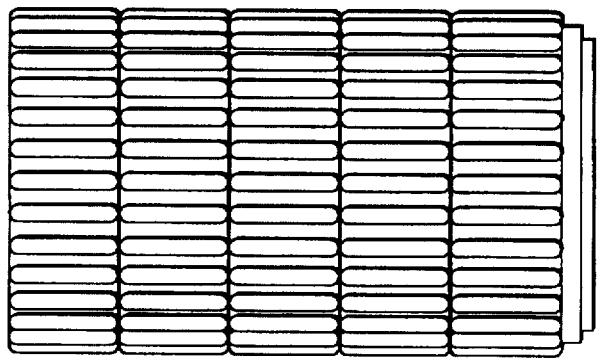
Figure 4:
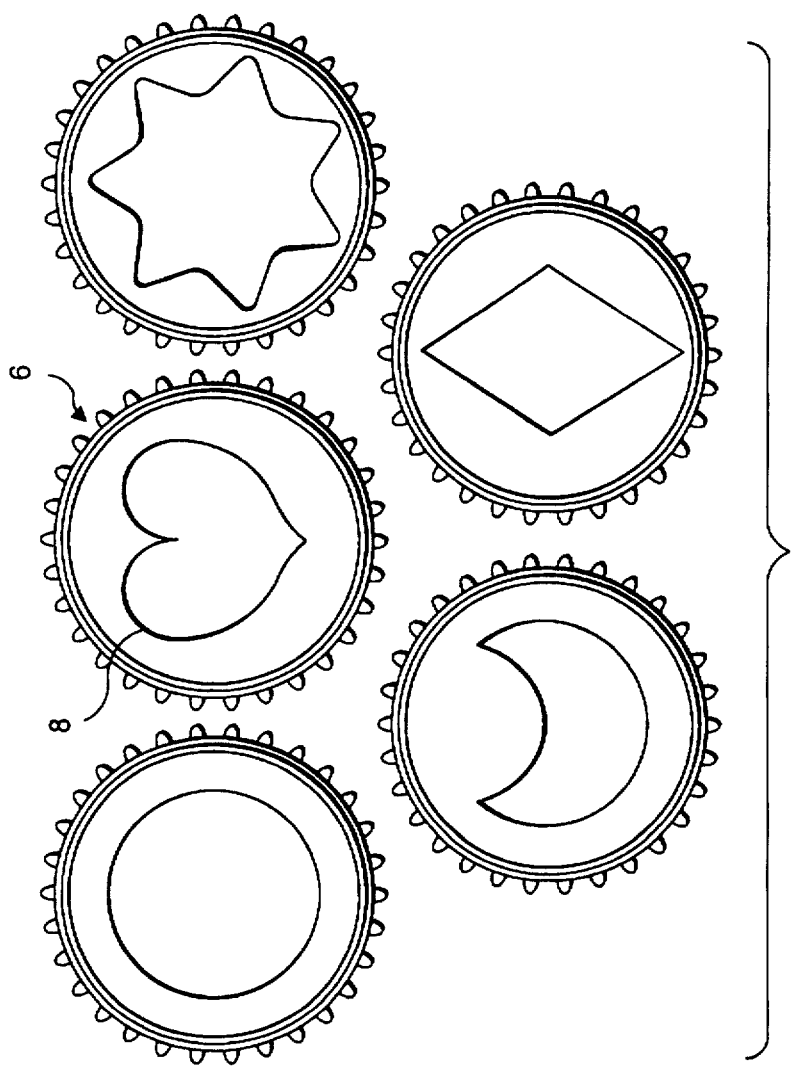
FIG. 4 is a top view of several unconnected embodiments of a linking module having a cookie cutter mold on a face thereof, as well as embossed ribbing around the perimeter.

A modular rolling pin 2 is composed of a plurality of interlocking modules, including dough storage modules 4 and linking modules 6. All of the modules, both dough storage 4 and linking 6, are cylindrical in shape, and are interchangeably linkable by way of either of the flat ends thereof to another module. The ends 10a, 10b of the modules may be adapted for snap-fitting with the other modules or may have screw threads or any other type of securing means, such as friction force-fitting. Thus, the modules may be linked in any order to form a cylindrical rolling pin. For example, linking modules and dough storage modules may be alternately connected, or several of the same type of module may linked together directly, to form a rolling pin of varying length. Furthermore, the cylindrical perimeter of any of the modules may have an embossed design 12, to impart that design to dough being rolled by the rolling pin.

The heart of the invention lies particularly in the unique dough storage modules 4. As moist dough has a tendency to dry out, it is preferable if the dough storage module maintains an airtight seal. The dough storage module consists of two opposed sections 4a, 4b, which when linked together, form a dough storage space 5. As shown in the drawing, a preferred embodiment comprises two modules, each defining a hemispherical space, which form a closed spherical space when linked together. Dough placed in one or both of the halves will then be compressed to take on a generally spherical shape of the space upon closure of the two halves together.

The invention is advantageous over the prior art in providing easy access to the stored dough by way of two opposing separable storage module halves. In addition, the hemispherical shape of the storage spaces allows for easy removal of the stored dough, while providing the dough in a compressed round shape which is readily workable when removed. Any reasonably shallow, rounded shape would also be acceptable for the storage modules, such as an egg shape. It is thus clear that deep spaces are troublesome in that a hand may be unable to remove all of the dough from the bottom of such a space, while corners present could act to trap dough in the space.

In a preferred embodiment, the dough storage modules may be made of a transparent material so that the stored dough can be seen from the outside of the rolling pin.

Any of the modules may have on an end face thereof means for molding dough. Thus, as shown in FIG. 1, the end face of linking module 6 is hollowed out, except for raised portions, which in this case are formed by the circular linking means on the border, and a heart shape in the center. When the end face is pressed against dough on a flat surface a heart shaped piece of dough may be cut. Those skilled in the art will realize that any conceivable shape of the raised portion can be provided on the end face to form a mold or "cookie cutter".

What is claimed is:

1. A modular rolling pin comprising one or more cylindrical linking modules and one or more cylindrical dough storage modules, the linking modules and the dough storage modules being releasably and interchangeably lockable to each other, each of said dough storage modules comprising two opposing sections for retaining dough therein, each of said sections defining a corresponding section of a generally rounded dough storage space.

2. The modular rolling pin of claim 1, wherein the dough storage space is a sphere.

3. The modular rolling pin of claim 1, wherein at least one of the linking modules has on an end face thereof a mold.

4. The modular rolling pin of claim 1, wherein at least one of the linking modules has on the perimeter thereof an embossed design.

5. The modular rolling pin of claim 1, wherein the dough storage modules are transparent.

6. The modular rolling pin of claim 1, wherein the sections of the dough storage module are relatively shallow so as to permit the removal of dough easily therefrom with a human hand.

* * * * *